United States Patent [19]
Warchol et al.

[11] Patent Number: 5,509,455
[45] Date of Patent: Apr. 23, 1996

[54] AIRCRAFT TIRE INCLUDING REINFORCEMENT INSERTS

[75] Inventors: John T. Warchol, Poland; Raymond W. Millmier, Akron; Gordon B. Bryant, Hudson, all of Ohio

[73] Assignee: The Goodyear Tire & Rubber Company, Akron, Ohio

[21] Appl. No.: 226,531

[22] Filed: Apr. 12, 1994

[51] Int. Cl.[6] .............................. B60C 9/00; B60C 9/06; B60C 9/08; B60C 15/05
[52] U.S. Cl. .......................... 152/545; 152/458; 152/550; 152/552; 152/553; 152/555; 152/559; 152/560
[58] Field of Search .................................. 152/545, 555, 152/458, 539, 542–543, 549–554, 558–561

[56] References Cited

U.S. PATENT DOCUMENTS

| | | | |
|---|---|---|---|
| 2,063,105 | 12/1936 | King | 152/559 X |
| 3,339,610 | 9/1967 | Fausti et al. | |
| 3,613,762 | 10/1971 | Reinhart, Jr. | |
| 3,693,690 | 9/1972 | Mills et al. | |
| 3,703,203 | 11/1972 | Simpson | |
| 4,029,137 | 6/1977 | Suydam | |
| 4,377,193 | 3/1983 | Smith | |
| 4,438,796 | 3/1984 | Abe et al. | 152/545 X |
| 4,442,880 | 4/1984 | Takahashi | |
| 4,609,023 | 9/1986 | Loser | |
| 4,790,364 | 12/1988 | Lobb et al. | |
| 4,890,660 | 1/1990 | Lamock | |
| 4,934,428 | 6/1990 | Aoki et al. | |
| 5,007,472 | 4/1991 | Kuze et al. | |
| 5,088,537 | 2/1992 | Kan et al. | |
| 5,105,865 | 4/1992 | Togashi et al. | |
| 5,117,886 | 6/1992 | Tokutake | |

FOREIGN PATENT DOCUMENTS

| | | | |
|---|---|---|---|
| 2-299904 | 12/1990 | Japan | 152/555 |
| 2087806 | 6/1982 | United Kingdom | |

*Primary Examiner*—Adrienne C. Johnstone
*Attorney, Agent, or Firm*—David L. King

[57] ABSTRACT

An aircraft tire 10 has at least two circumferentially extending reinforcement inserts. At least one pair of reinforcement inserts 90 is located on each side of the tire. Each insert 90 preferably has two cord reinforced members 91, 92 having bias angled cords. The cords are equal but opposite in orientation relative to the cords of the adjacent member. The pairs of reinforced members 91, 92 extend from the bead portions 18, 20 and terminate in a radially upper portion of the sidewalls 14A, 16A. In the preferred embodiment, each bead portion 18, 20 includes three substantially inextensible bead cores 50, 52 and 54. Each pair of members 91, 92 is interposed between a pair of carcass plies 36, 37, 38, 39, 40, 41, 42, 43 on the ply side of the tire 10. This structure can increase tire durability while at the same time achieve a significant weight reduction.

17 Claims, 6 Drawing Sheets

AIRCRAFT TIRE INCLUDING REINFORCEMENT INSERTS

BACKGROUND OF THE INVENTION

This invention relates to pneumatic tires and more particularly to a novel carcass structure specifically for use in aircraft tires.

An aircraft tire is subjected to extreme operating conditions which include very high internal pressure, high speeds in excess of 300 kilometers per hour, and very high deflections. While taxiing, the deflection may be more than 30%, on takeoff 40%, and on landing 45% deflection or more under impact conditions. These extreme pressures, loads and deflections put the sidewall between the shoulder of the tire and the bead to severe tests. The high pressure and loads place the ply cords under severe tensile loads. The cords in the plies, particularly in the lower sidewall area, are frequently mechanically fatigued due to high heat buildup near the beads while the aircraft is taxiing or during takeoff.

In the prior art, it has been conventional to increase the number of plies of the tire to increase rigidity and to decrease deformation under load. Also much work has been directed to reinforcing the ply turnup portion of tires to improve durability.

U.S. Pat. No. 5,105,865 by Togashi et al. describes these conventional solutions and proposes that the durability of the tire can be improved by avoiding bending deformations of the ply surfaces. The patent describes a tire curvature that permits an increase in durability to be achieved with no increase in weight.

U.S. Pat. No. 4,029,137 by Robert Suydam teaches that an improvement in durability can be achieved by a novel wrapping of the ply structure about the beads. This invention also improves durability without increasing weight.

In British Patent GB 2 087 806 to TaKahashi, a bias aircraft tire is disclosed wherein cords of the carcass plies are spaced further apart to achieve improved durability.

The present invention discloses a novel approach to improve sidewall durability while enabling a reduction in overall tire weight.

SUMMARY OF THE INVENTION

An improved aircraft tire having a tread portion 12, a pair of sidewall portions 14, 16, a pair of spaced apart bead portions 18, 20 having at least one, preferably two or three substantially inextensible bead cores 50, 52, 54 disposed side-by-side and spaced apart axially, and a plurality of carcass plies 36, 37, 38, 39, 40, 41, 42, 43 extending circumferentially about the tire 10 from bead portion 18 to bead portion 20 is described. Each ply has a ply side extending between the bead cores 50, 52, 54 of opposite bead portions.

The improved tire 10 has at least two circumferentially extending reinforcement inserts 90. At least one reinforcement insert 90 is located on each side of the tire 10. The reinforcement inserts 90 extend from the bead portions 18, 20 and terminate in a radially upper portion of the sidewalls 14A, 16A. Each insert 90 is interposed between a pair of carcass plies on the ply side.

Preferably, each reinforcement insert 90 consists of a pair of axially adjacent cord reinforced members 91, 92, each cord reinforced member 91, 92 having bias 35 angled cords, the cords being equal but opposite in orientation relative to the cords of the adjacent member. Each of the cord reinforced members 91, 92 preferably has an elongation under load similar to the adjacent carcass plies 36, 37, 38, 39, 40, 41, 42, 43. Preferably, the cords of the plies and the reinforcement members 91, 92 are the same; more preferably, textile such as nylon or aramid. Alternatively, each reinforcement insert 90 can be an elastomeric material containing fiber reinforcement.

DEFINITIONS

Figure 1:
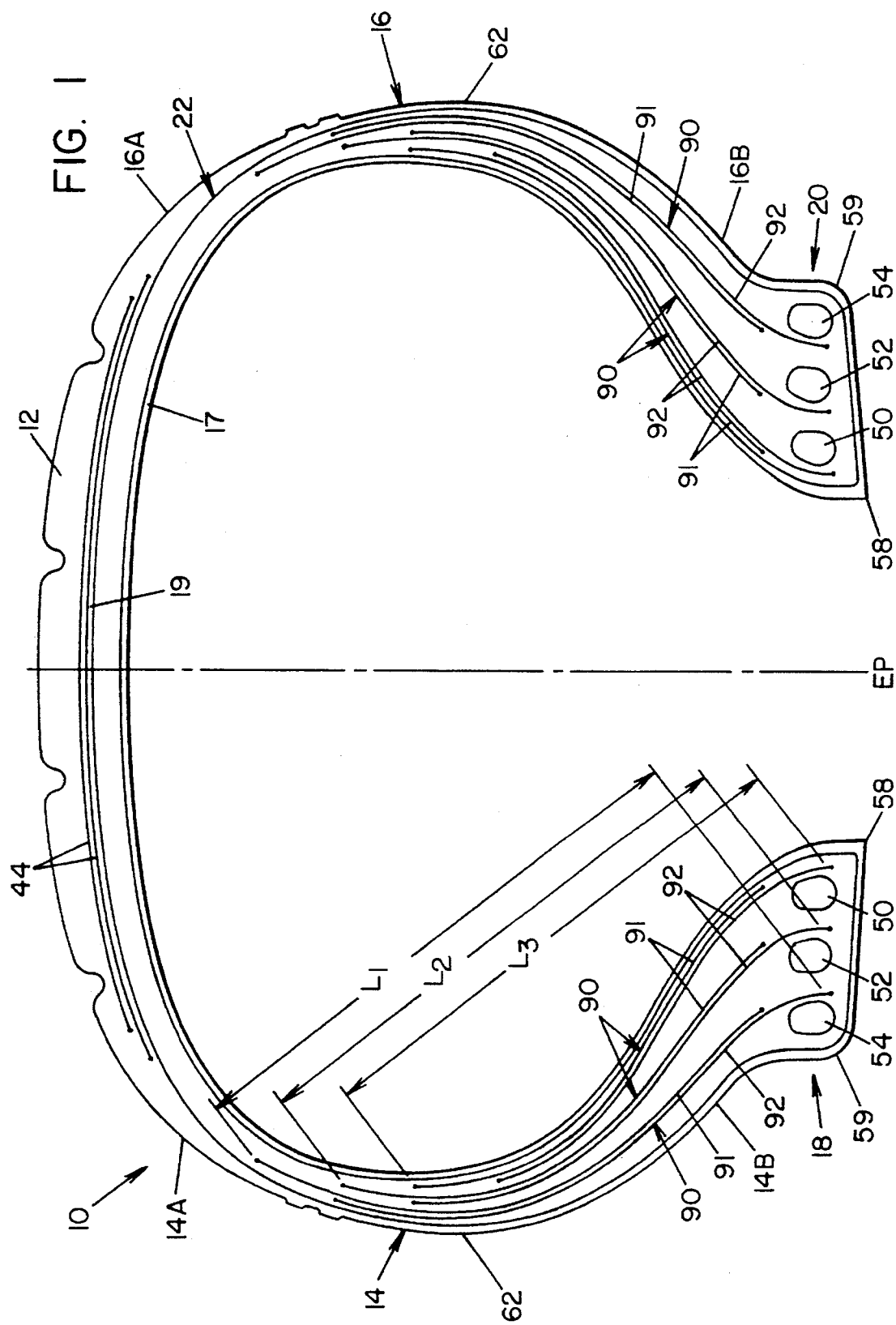
FIG. 1 is a cross-sectional view illustrating the improved aircraft tire made in accordance with the present invention.

"Apex" means a non-reinforced elastomer positioned radially above a bead core.

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt or breaker reinforcing structure" means at least two layers of plies of parallel cords, woven or unwoven, underlying the tread, unanchored to the bead, and having both left and right cord angles in the range from 17 degrees to 33 degrees with respect to the equatorial plane of the tire.

"Bias ply tire" means a tire having a carcass with reinforcing cords in the carcass ply extending diagonally across the tire from bead core to bead core at about a 25°–50° angle with respect to the equatorial plane of the tire. Cords run at opposite angles in alternate layers.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Chafers" refers to narrow strips of material placed around the outside of the bead to protect cord plies from the rim, distribute flexing above the rim, and to seal the tire.

"Chippers" mean a reinforcement structure located in the bead portion of the tire.

"Cord" means one of the reinforcement strands of which the plies in the tire are comprised.

"Equatorial plane (EP)" means the plane perpendicular to the tire's axis of rotation and passing through the center of its tread.

"Flipper" means a reinforced fabric wrapped about the bead core and apex.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Net-to-gross ratio" means the ratio of the tire tread rubber that makes contact with the road surface while in the footprint, divided by the area of the tread in the footprint, including non-contacting portions such as grooves.

"Nominal rim diameter" means the average diameter of the rim flange at the location where the bead portion of the tire seats.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Ply" means a continuous layer of rubber-coated parallel cords.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

DETAILED DESCRIPTION OF THE INVENTION

With reference to FIG. 1, there is illustrated a tire 10 which in the specific embodiment illustrated is a size H49× 19.0–22 tire. The tire has a 49 inch (124.5 cm) maximum inflated outside diameter and the maximum width of the inflated tire in axial directions is 19 inches (48.3 cm) and the tire has a nominal bead diameter of 22 inches (55.9 cm).

The tire 10 includes a ground engaging circumferentially extending tread portion 12, a pair of sidewalls 14, 16 extending radially inwardly from the axially outer edges of the tread portion and terminating at their radial extremities in a pair of bead portions 18, 20. The sidewalls 14, 16 each have an upper portion 14A, 16A in the shoulder region of the tire radially inward of the tread and radially outward of the maximum section width of the tire, and a lower portion 14B, 16B radially inward of the maximum section width of the tire. A cord reinforced carcass structure 22 extends circumferentially about the tire and from bead portion 18 to bead portion 20.

The particular embodiment of the cord reinforcing structure 22 includes eight pairs of plies of tire cord fabric 36, 37, 38, 39, 40, 41, 42 and 43. Each pair of plies has one of its plies extending at one bias angle with respect to the equatorial plane or circumferential center line of the tire, and the other ply at the same angle but extending in the opposite direction with respect to the equatorial plane. The angle that the cords in the individual carcass plies make with respect to the equatorial plane decreases progressively from an angle of about 34° in the radially inner pair of plies 36° to 30° in the radially outer pair of plies 43.

Also included in the carcass structure is a pair of tread breaker plies 44 extending circumferentially about the carcass and generally from one edge of the tread portion 12 to the axially opposite edge of the tread portion 12. The angle of the cords in the tread plies with respect to the equatorial plane is approximately 26°. The material of the cords in all of the plies in the carcass structure 22 is nylon although any suitable material or combination of materials can be utilized. It is believed preferable that the cords be a textile material. Further, while specific angles have been specified for the carcass and tread plies, these angles can be varied within the normal range of bias ply aircraft tires. For example, the angles of the carcass plies could be from 25° to 45° while the angle of the tread breaker plies can be from about 20° to 45° for a bias ply aircraft tire.

Interposed between the tread breaker plies 44 and the carcass plies is a cushion gum layer 19.

The bead portions 18, 20 each include three annular substantially inextensible bead cores 50, 52 and 54.

Three pairs of carcass plies 36, 37 and 38 extend radially inwardly of the tire adjacent to the axially inner sides of the axially inner bead cores 50. The respective end portions 36a, 37a, and 38a are turned axially outwardly about bead cores 50 and ply ends 37a, 38a are turned radially outwardly about bead core 50 while ply ends 36a turns radially outwardly about bead cores 54.

Carcass plies 39 and 40 similarly extend radially inwardly adjacent to the axially inner sides of the central or middle bead cores 52 and have their end portions 39a and 40a turned radially outwardly of the bead cores 52.

Carcass plies 41 extend radially inwardly about the axially outer sides of the middle bead cores 52 and the ply ends 41a are turned axially inwardly adjacent the radially inner sides of the bead cores 50 and 52. Since the pairs of carcass plies 41 are wrapped about two sides of the bead cores 52 as they progress radially inwardly from the tread 12, the tensile loading of these plies caused by inflation pressure and loading on the tire are supported by bead core 52.

The axially outer bead cores have a pair of carcass plies 42 extending radially inwardly adjacent the axially inner sides of the bead cores and has its end portions 42a turned axially outwardly adjacent the radially inner sides of the bead cores. The turnup ends 42a turn radially outwardly adjacent the axially outer sides of the bead cores 54.

Carcass plies 43 extend radially inwardly interposed between the turnup ends 36a and the axially outer sides of the bead cores 54. The carcass ply end portions 43a turn axially inwardly adjacent the radially inner sides of bead cores 54 extending inwardly to the radially inner sides of bead cores 50. The end portions 43a are interposed between the bead cores 50, 52 and 54's radially inner sides and the end portions 36a. The end portions 36a terminate in the lower sidewall areas at a point radially inwardly of the point 62 of maximum section width of the inflated tire.

For the purposes of this invention, an end portion shall be that portion of a carcass ply that wraps about or extends radially outwardly from a bead core. If an end portion terminates short of the point 62 of maximum axial width of the tire, it is not considered a working portion of the ply since it does not exert a significant radially outwardly directed pull on the bead core. A bead core that absorbs a major radially outwardly directed pull of a carcass ply is an active or working bead core, and for purposes of this invention is a bead core bounded on any axial side and a radially inner side by the working portion of a carcass ply. The working portion of a carcass ply is that portion of the ply extending from a bead on one side of the tire to the opposite side's bead, and for purposes of this invention the working portion of the carcass plies is called the ply side; the non-working portion is the turn-up or end portion of the ply.

Figure 2:
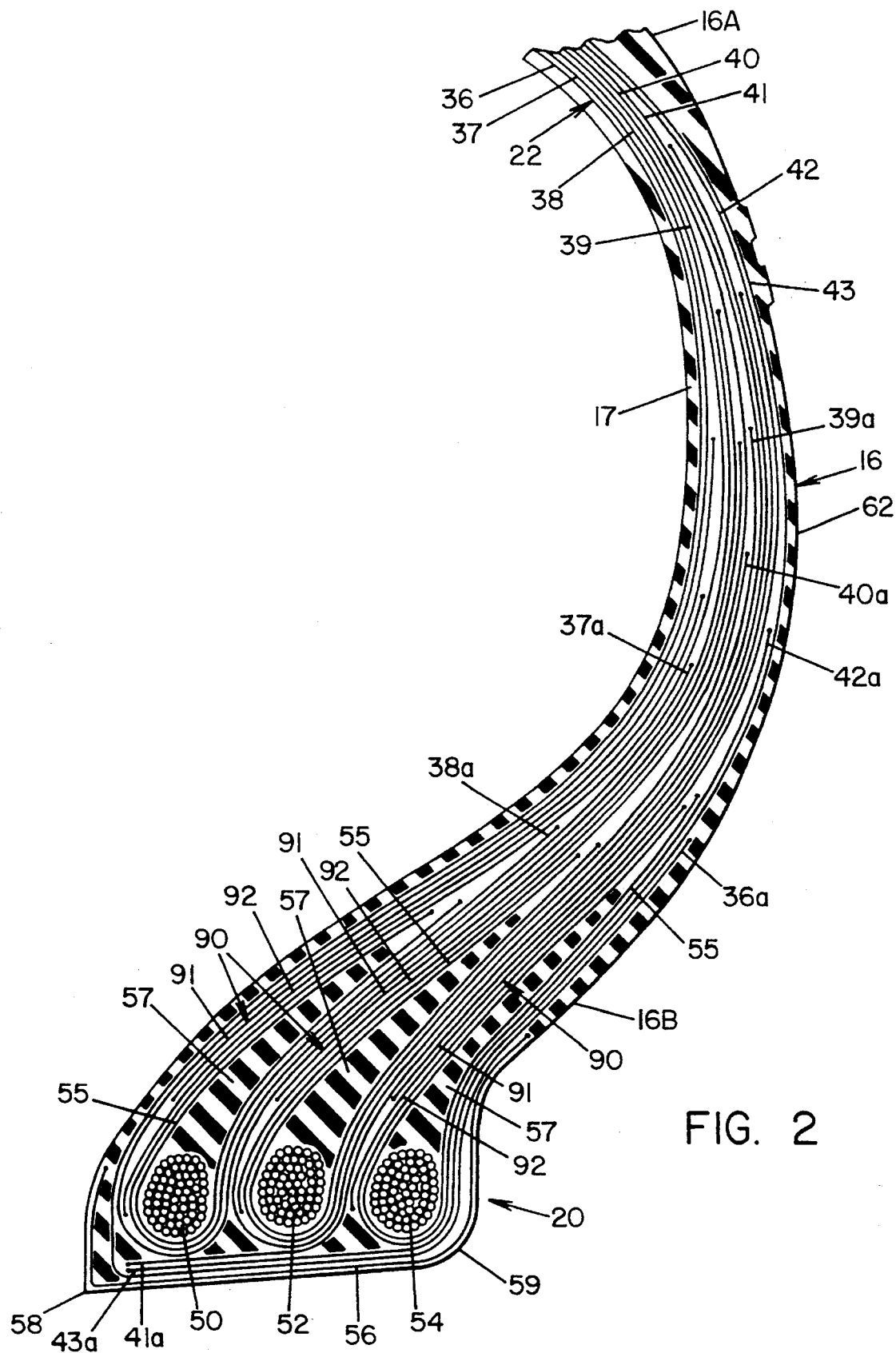
FIG. 2 is a further enlarged cross-sectional view illustrating one side or half of a symmetrical tire made in accordance with the present invention.
Figure 5:
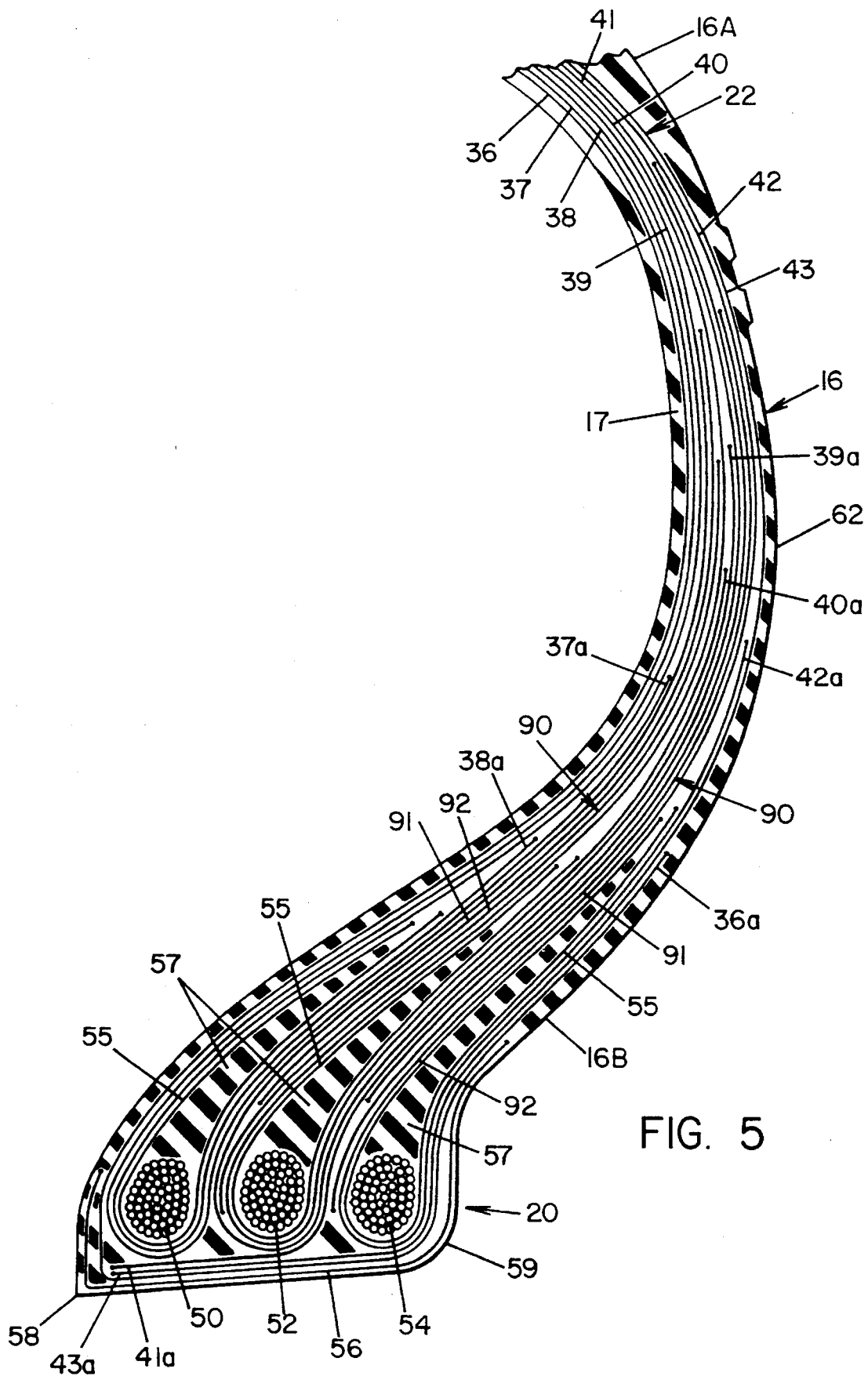
FIG. 5 is a further enlarged cross-sectional view of one side of the alternative tire of FIG. 4.

Referring to FIGS. 2 and 5 of each embodiment illustrated, is a group of structural components employed in the tires.

Radially above each bead core 50, 52, 54 is an elastomeric apex 57. Wrapped about each bead core and axially adjacent each apex is a flipper 55. Wrapped about the entire bead structure is a chafer 56. The chafer 56 extends radially inwardly from an axially outer end toward the bead heel 59, turns axially inwardly extending to the bead toe 58 where the chafer 56 turns radially outwardly to an axially inner end. In the embodiment as illustrated, the air chamber formed by the tire is surrounded by a generally air impervious innerliner 17 extending from bead to bead.

Figure 3:
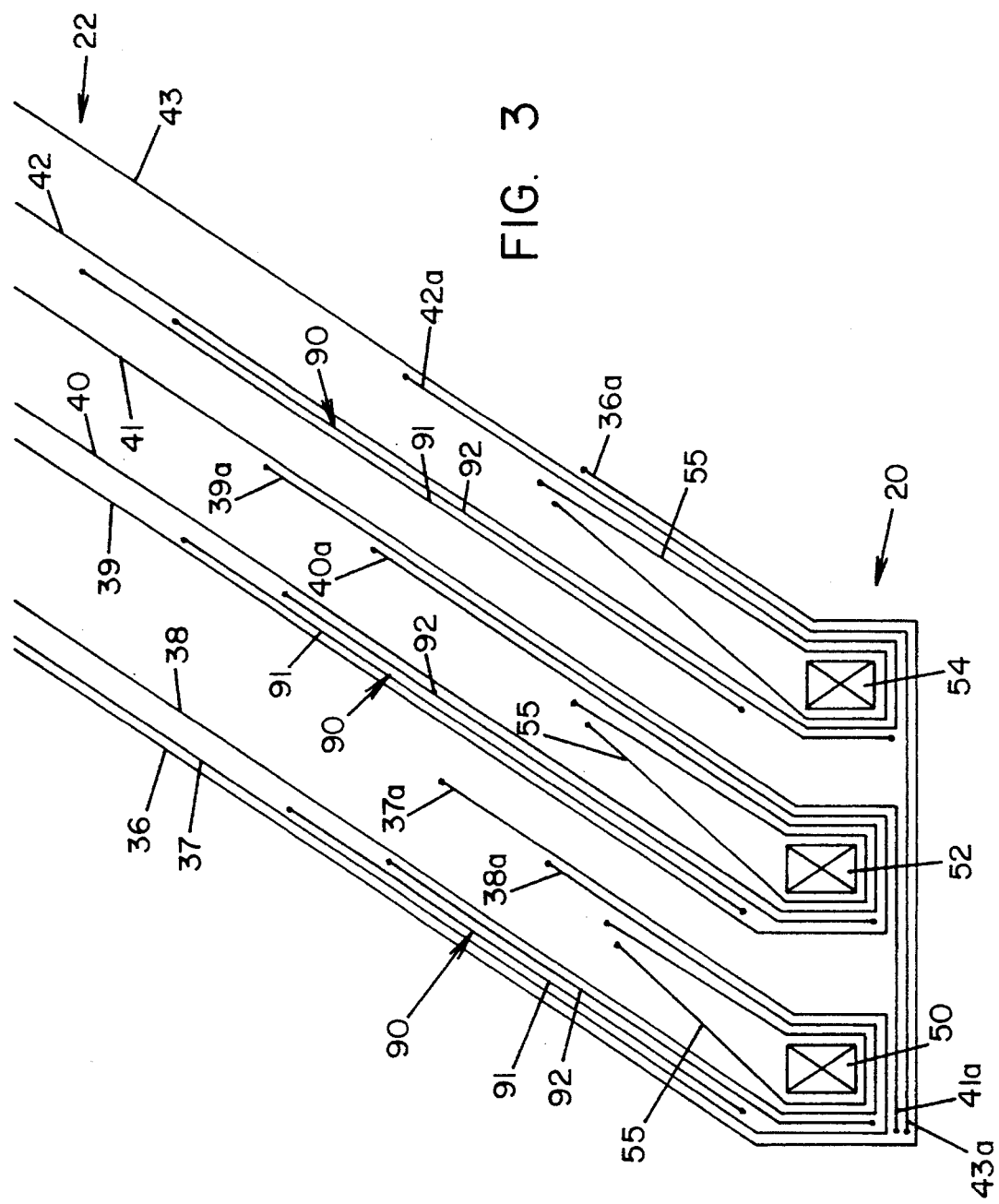
FIG. 3 is a schematic view of one half of the tire showing the ply, insert, and bead core orientation, it being understood that the opposite half of the tires are similar to the illustrated portions.

As illustrated in FIGS. 1 and 2, and shown in schematic FIG. 3, a reinforcement insert 90 is interposed between pairs of plies 37, 38, pairs of plies 39, 40 and pairs of plies 41, 42. As shown, the inserts 90 are positioned on the ply side of the plies and extend from adjacent or slightly above the bead cores radially and axially outwardly to a radially outer end below the tread 12 in the upper sidewall 14A, 16A region of the carcass 22.

In the best mode of practicing the invention, the reinforcement inserts 90 consist of a pair of cord reinforced members 91, 92. The cords in the reinforced members 91, 92 are at bias angles relative to the circumferential center line, the cord angle of one member of a pair being equal to but opposite in orientation relative to the cords of the adjacent member of the same pair.

It is believed preferable that the insert cords have a tensile elongation substantially similar to the nylon cord of the plies. For that reason, the cords in the preferred embodiment were made of nylon. Alternatively, the cords could be any other suitable textile type material.

It is believed that the reinforcement insert 90 could be fabricated from an elastomeric material having fiber reinforced materials.

The reinforcement insert 90 extends circumferentially around the tire 10 in the working area or ply side. The purpose of the reinforcement insert 90 is to increase the carcass 22 lower to upper sidewall strength with a corresponding decrease in weight when compared to conventional bias ply aircraft tires. The carcass strength is increased by locating load carrying reinforcement inserts 90 in the sidewall 14, 16.

In a first use of the invention as illustrated in FIG. 1, the inserts 90 were fabric plies 91, 92 having the same green angle as the adjacent full casing plies on either side of the insert 90. The insert fabric plies 91, 92 were located in the tire 10 in pairs, one fabric member 91 oriented at an angle left and one 92 at an equal angle right. One such two-ply fabric insert 90 was located adjacent the axially inner side of each bead core 50, 52, 54 and extended radially outwardly to the upper sidewall portion 14A, 16A. The inserts 90 were located between full band plies and had the radially inner end purposely terminated such that the insert end did not extend around the bottom of the beads 50, 52, 54.

Figure 4:
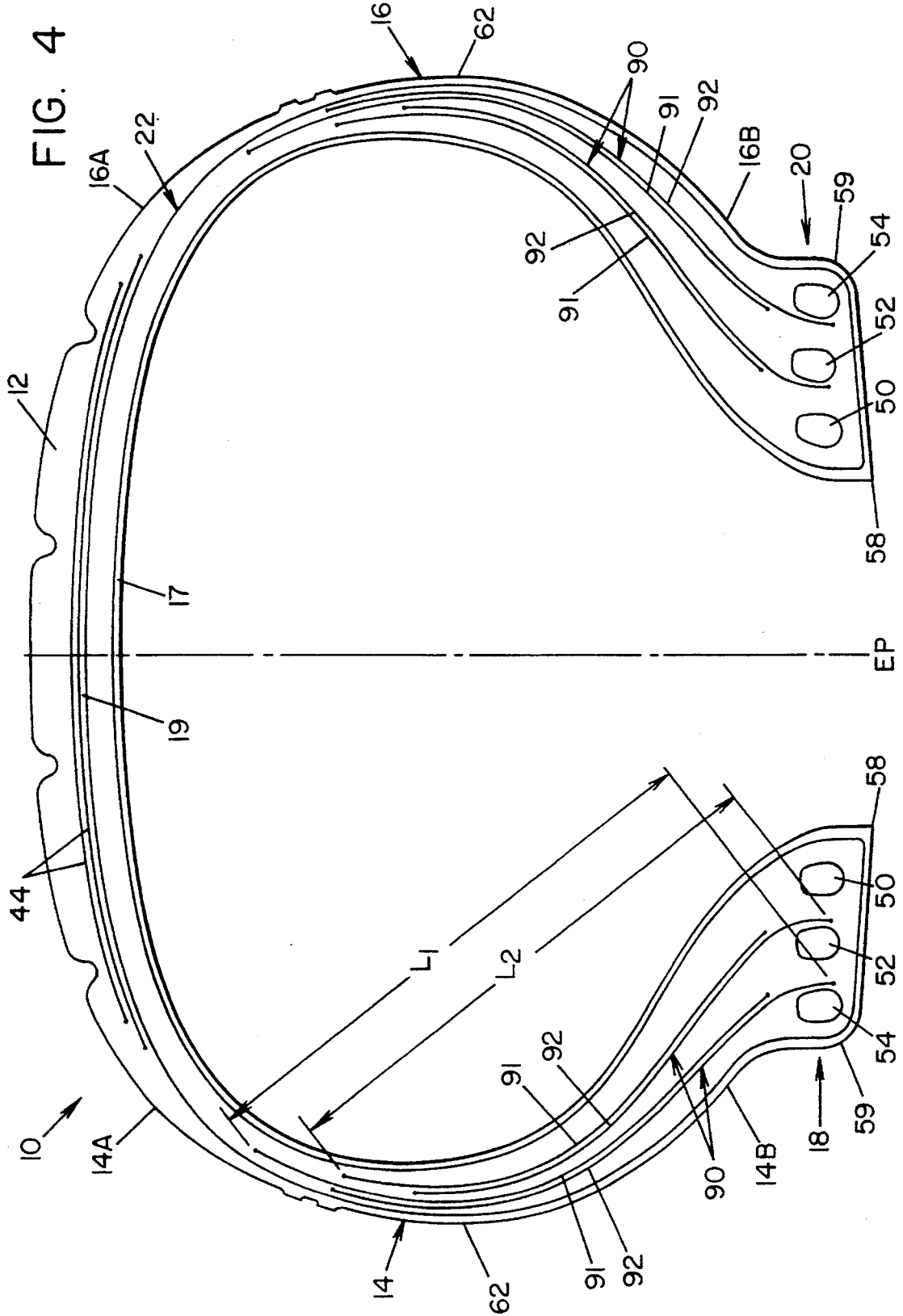
FIG. 4 is a cross-sectional view of an alternative embodiment of an improved aircraft tire made according to the present invention.
Figure 6:
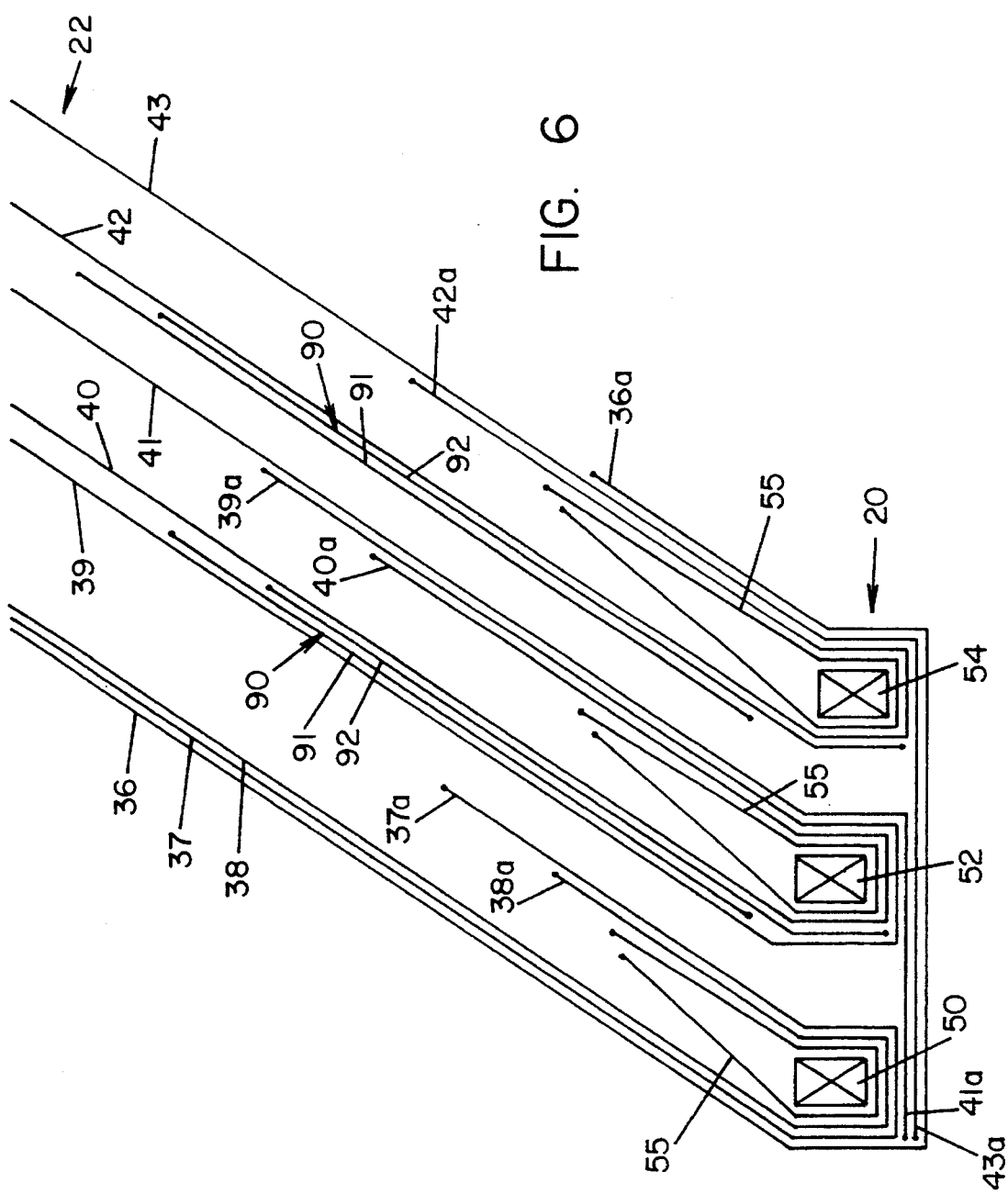
FIG. 6 is a schematic view of one half of the tire showing the ply, insert and bead core orientations, it being understood that the opposite half of the tires are similar to the illustrated portions.

Although three sets of inserts 90 per tire side were used in the early evaluation of this invention (as shown in FIGS. 1, 2 and 3), it was determined that two sets per side was sufficient in the application being evaluated. The tire having two sets of inserts 90 are illustrated in FIGS. 4–6. One insert 90 is positioned between pairs of plies 39, 40 and pairs of plies 41, 42. One, two, three or four sets of inserts 90 per tire side can be used, depending on how much additional carcass strength is required.

Although the inserts 90 were used having pairs of bias angled cord reinforced members 91, 92, it is believed that the cord reinforced members 91, 92 can be individually used. Also in the above description, the cord reinforced members had bias angles in the same range as the carcass plies. Alternatively, higher angles up to 90° could be used.

Historically, bias ply aircraft tires have been designed with full width carcass plies, which extend from a bead bundle on one side of the tire to the bead bundle on the other side of the tire. In order to increase carcass strength in any one area of the tire, it was common practice to add full width plies to the carcass. The present invention, by adding fabric or fiber inserts between plies on the working or ply side of the tire, strengthens only the area requiring the strength increase. Since full plies are not used, there is a substantial tire weight savings.

An aircraft tire 10 built in accordance with the present invention as shown in FIGS. 4, 5, and 6 was tested against standard production aircraft tires for standard durability. The standard or control tire was size H49×19.0–22 and the test tire 10 was made of the same materials and of similar construction as the standard tire, except for the addition of two pairs of fabric reinforced inserts 90 per side. The test tire 10, according to the present invention, exhibited an improvement of 10% over the durability of the standard tire without inserts. The sidewalls 14, 16 of the test tire had a percent deflection under load of 33% whereas the non-inserted standard tire exhibited a similar 33% deflection under the same load of 56,600 pounds at the same air pressure. This is as to be expected because the air pressure exerts the same tensile load on the cords; however, the tire 10 with inserts 90 having more load carrying cords exhibits less load per cord. The reduced load per cord results in an extended cord life as demonstrated by the improved durability test results. This tire 10 was developed to handle the increased loads for large commercial airliners.

In a tire 10 built according to the present invention and for use in an aircraft currently in development as illustrated in FIGS. 4–6, an increase in durability was achieved using only two inserts 90 per side of the tire. A standard tire with the same number of full plies as the test tire but without inserts was evaluated. It failed the standard durability test. This standard tire had a weight of 231 pounds. The tire according to the invention passed the test and had weight of 241 pounds. To achieve the same level of sidewall durability using four additional conventional full ply pairs a tire weight of 254 pounds would result. As can be seen above, significant durability improvements can be achieved without the normal weight penalty associated with the use of additional full width plies.

Most remarkable are the test results achieved when the tires are subjected to a 60% overload durability test. In this most severe test, the standard tire was an 18 full ply bias aircraft tire with no insert, while the test tire, according to the present invention, was a 16 full ply tire with only two inserts 90 per tire side, the test tire being constructed as shown in FIGS. 4 through 6. The standard 18 ply tire, if rated 100% under the test conditions, was surpassed by the test tire which rated 125%. A 25% durability improvement of the test was achieved under this severe test. The test tire with two inserts per side weighed 241 pounds while the 18 ply standard tire weighed 263 pounds. An 18 pound weight reduction was achieved while improving durability significantly.

The inserts 90 being located on the ply side of the ply, or the load carrying side, and being sandwiched or securely fixed between adjacent plies, insures that the inserts 90 act like conventional full width tensile load bearing plies. Terminating the radially inner end of the insert 90 radially above or adjacent to the bead core 50, 52, 54 without requiring a turnup portion, further results in a weight savings.

The radially outer end of the insert 90 terminates radially below the tread portion 12 in the upper shoulder region of the tread. Preferably, the radially outer end of the insert 90 is about halfway between the point 62 of maximum section width and the axial end of the tread portion 12. It is believed preferable that the length (L) of the inserts increases as a function of axially outward position. This is illustrated in FIG. 1 wherein $L_1>L_2>L_3$ and FIG. 4 wherein $L_1>L_2$. When the insert 90 is composed of two fabric plies 91, 92, it is preferred that the end of each ply is slightly staggered as illustrated in FIGS. 1 or 4.

Although the invention illustrates and describes the use of inserts on bias aircraft tires having at least two bead cores on each side of the tired it is believed feasible to employ the inserts as described above on radial ply aircraft tires having only one bead per tire side.

What is claimed:

1. An aircraft tire having a tread pattern, a pair of sidewall portions, a pair of spaced apart bead portions having at least one substantially inextensible bead core disposed side by side and spaced apart axially, and a plurality of carcass plies extending circumferentially about the tire from bead portion to bead portion, each ply having a ply side extending between the bead cores of opposite bead portions, the improvement comprising:

at least two circumferentially extending reinforcement inserts, at least one reinforcement insert on each side of the tire, the reinforcement inserts extending from the bead portions and terminating in a radially upper portion of the sidewalls, each reinforcement insert having a pair of axially adjacent cord reinforced members, each insert being interposed between a pair of carcass plies on the ply side.

2. The aircraft tire of claim 1, wherein the cord reinforced members have bias angled cords, the cords being equal but opposite in orientation relative to the cords of the adjacent cord reinforced member.

3. The aircraft tire of claim 1 wherein the cords of the carcass plies and the cords of the reinforced members are of a textile material having the same percent elongation.

4. The aircraft tire of claim 3, wherein the cords of the plies and the cords of the reinforced members are nylon.

5. The aircraft tire of claim 1 wherein the pair of axially adjacent cord reinforced members of each insert are radial plies.

6. The aircraft tire of claim 5 wherein the cords of the reinforced members are nylon cords.

7. The aircraft tire of claim 1 wherein the carcass plies have radially extending cords.

8. The aircraft tire of claim 1 wherein the carcass plies have bias angled cords and are wrapped about at least two substantially inextensible bead cores.

9. The aircraft tire of claim 1 wherein the tire has two inserts per side.

10. The aircraft tire of claim 1 wherein the tire has three inserts per side.

11. The aircraft tire of claim 1 wherein the tire has four inserts per side.

12. An aircraft tire having a tread pattern, a pair of sidewall portions, a pair of spaced apart bead portions having at least two substantially inextensible bead cores disposed side by side and spaced apart axially, and a plurality of carcass plies extending circumferentially about the tire from bead portion to bead portion, each ply having a ply side extending between the bead cores of opposite bead portions, the improvement comprising:

at least two circumferentially extending pairs of cord reinforced members, at least one pair on each side of the tire, each member having bias angled cords, the cords being equal but opposite in orientation relative to the cords of the adjacent member, the pairs of cord reinforced members extending from the bead portions and terminating in a radially upper portion of the sidewalls, each pair of reinforced members being interposed between a pair of carcass plies on the ply side.

13. The improved tire of claim 12, wherein the plies and the reinforced members have cords of the same textile material.

14. The aircraft tire of claim 12 wherein the cords of the plies and the cords of the reinforced members are nylon.

15. The aircraft tire of claim 12 wherein the tire has two pairs of cord reinforced members per tire side.

16. The tire of claim 12 wherein the tire has three pairs of cord reinforced members per tire side.

17. The tire of claim 12 wherein the tire has four pairs of cord reinforced members per tire side.

* * * * *